(12) United States Patent
Suzuki et al.

(10) Patent No.: US 10,875,396 B2
(45) Date of Patent: Dec. 29, 2020

(54) VEHICLE

(71) Applicant: HONDA MOTOR CO., LTD., Tokyo (JP)

(72) Inventors: Takanori Suzuki, Saitama (JP); Takuro Tominaga, Saitama (JP); Shogo Nomura, Saitama (JP); Shogo Tsumura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/577,688

(22) Filed: Sep. 20, 2019

(65) Prior Publication Data

US 2020/0108707 A1 Apr. 9, 2020

(30) Foreign Application Priority Data

Oct. 5, 2018 (JP) .................. 2018-190258

(51) Int. Cl.
  *B60K 1/04* (2019.01)
  *B62D 25/08* (2006.01)
  *B60L 50/60* (2019.01)
(52) U.S. Cl.
  CPC ............... *B60K 1/04* (2013.01); *B60L 50/66* (2019.02); *B62D 25/082* (2013.01); *B60K 2001/0438* (2013.01)
(58) Field of Classification Search
  CPC .......... B60K 5/00; B60K 5/12; B60K 5/1216; B60K 1/04
  See application file for complete search history.

(56) References Cited

U.S. PATENT DOCUMENTS

| | | | | |
|---|---|---|---|---|
| 7,588,117 B2* | 9/2009 | Fukuda | ................ | B60L 3/0007 180/291 |
| 8,511,416 B2* | 8/2013 | Hiruma | ................ | B62D 21/11 180/299 |
| 8,813,883 B2* | 8/2014 | Fujiwara | ................ | B60K 6/46 180/65.22 |
| 9,394,004 B2* | 7/2016 | Gotou | ................ | B60L 50/66 |
| 9,469,182 B2* | 10/2016 | Merkel | ................ | B62D 21/155 |

(Continued)

FOREIGN PATENT DOCUMENTS

JP    2009-227083 A    10/2009

*Primary Examiner* — John D Walters
*Assistant Examiner* — James J Triggs
(74) *Attorney, Agent, or Firm* — Paratus Law Group, PLLC

(57) ABSTRACT

A driving device unit includes an electric motor configured to drive a vehicle, a drive device accommodating the electric motor, and an electric motor control device configured to control the electric motor. The drive device and the electric motor control device are arranged side by side in a horizontal direction, and an electrical connection portion electrically connecting the drive device and the electric motor control device is disposed at a joining portion between the drive device and the electric motor control device, and the drive device and the electric motor control device include a first fixing portion that directly fixes the drive device and the electric motor control device in the vicinity of the electrical connection portion, and a second fixing portion that fixes the drive device and the electric motor control device via a stiffener at a position away from the electrical connection portion.

7 Claims, 10 Drawing Sheets

(56) References Cited

U.S. PATENT DOCUMENTS

| | | | | |
|---|---|---|---|---|
| 10,381,959 B2* | 8/2019 | Yamane | ............... | H02P 6/06 |
| 2011/0308877 A1* | 12/2011 | Hiruma | ............... | B60K 5/12 |
| | | | | 180/299 |
| 2013/0248275 A1* | 9/2013 | Cunningham | ........... | B60K 1/00 |
| | | | | 180/299 |
| 2014/0367547 A1* | 12/2014 | Ohnishi | ............ | F16F 1/3849 |
| | | | | 248/638 |

* cited by examiner

VEHICLE

CROSS-REFERENCE TO RELATED APPLICATIONS

This application is based on and claims priority under 35 USC 119 from Japanese Patent Application No. 2018-190258 filed on Oct. 5, 2018.

TECHNICAL FIELD

The present invention relates to a driving device unit mounted on a vehicle.

BACKGROUND ART

In the electric vehicle of JP-A-2009-227083, a power plant accommodating an electric motor is disposed in a rear space of the vehicle, and the electric motor is driven by electric power of a battery disposed under the floor. The electric motor is connected to the battery via an inverter unit, and a rotational speed or the like of the electric motor is controlled by the inverter unit.

However, JP-A-2009-227083 does not disclose an electrical connection portion electrically connecting the power plant and the inverter unit, and there is room for improvement in a measure against stress acting on the electrical connection portion.

SUMMARY

An aspect of the present invention provides a driving device unit capable of reducing stress acting on an electrical connection portion that electrically connects a drive device and an electric motor control device.

An embodiment of the present invention relates to a driving device unit that includes:
  an electric motor configured to drive a vehicle;
  a drive device accommodating the electric motor; and
  an electric motor control device configured to control the electric motor,
  wherein the drive device and the electric motor control device are arranged side by side in a horizontal direction, and
  wherein an electrical connection portion electrically connecting the drive device and the electric motor control device is disposed at a joining portion between the drive device and the electric motor control device, and
  wherein the drive device and the electric motor control device include:
    a first fixing portion that directly fixes the drive device and the electric motor control device in the vicinity of the electrical connection portion; and
    a second fixing portion that fixes the drive device and the electric motor control device via a stiffener at a position away from the electrical connection portion.

Advantageous Effects of Invention

According to the above embodiment of the present invention, vibrations can be suppressed and stress acting on the electrical connection portion can be reduced by the first fixing portion that is positioned in the vicinity of the electrical connection portion and fixes the drive device and the electric motor control device, and the second fixing portion that is positioned away from the electrical connection portion and fixes the drive device and the electric motor control device.

DESCRIPTION OF EMBODIMENTS

Figure 1:
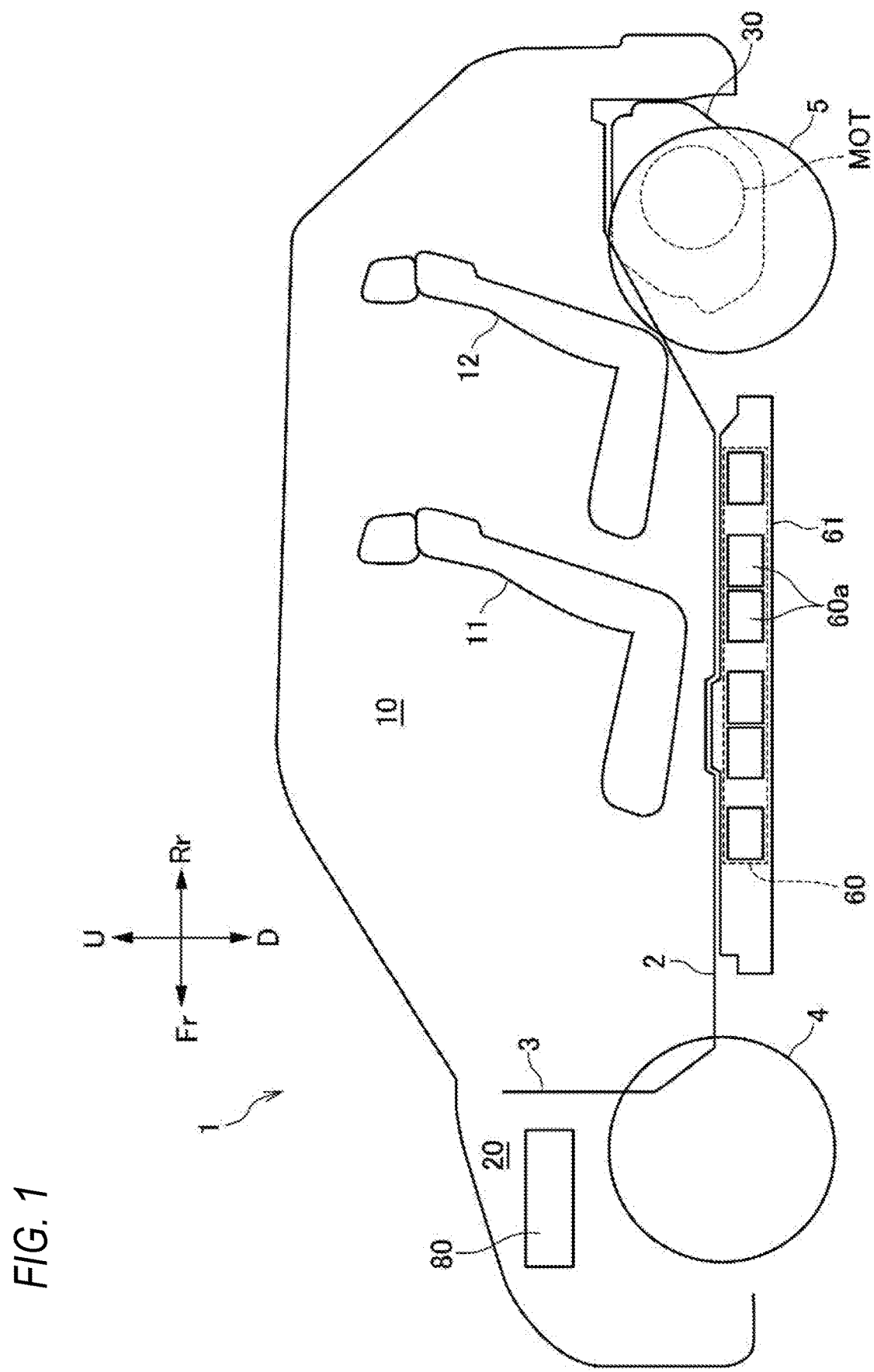
FIG. 1 is a schematic side view showing an overall structure of a vehicle according to an embodiment of the present invention.

Hereinafter, a driving device unit according to an embodiment of the present invention will be described with reference to the drawings. The drawings should be seen based on a direction of reference numerals. In the following description, front, rear, left, right, upper, and lower directions are described according a view from an operator. In the drawings, a front side of the vehicle is denoted by Fr, a rear side is denoted by Rr, a left side is denoted by L, a right side is denoted by R, an upper side is denoted by U, and a lower side is denoted by D.

[Overall Structure of Vehicle]

Figure 2:
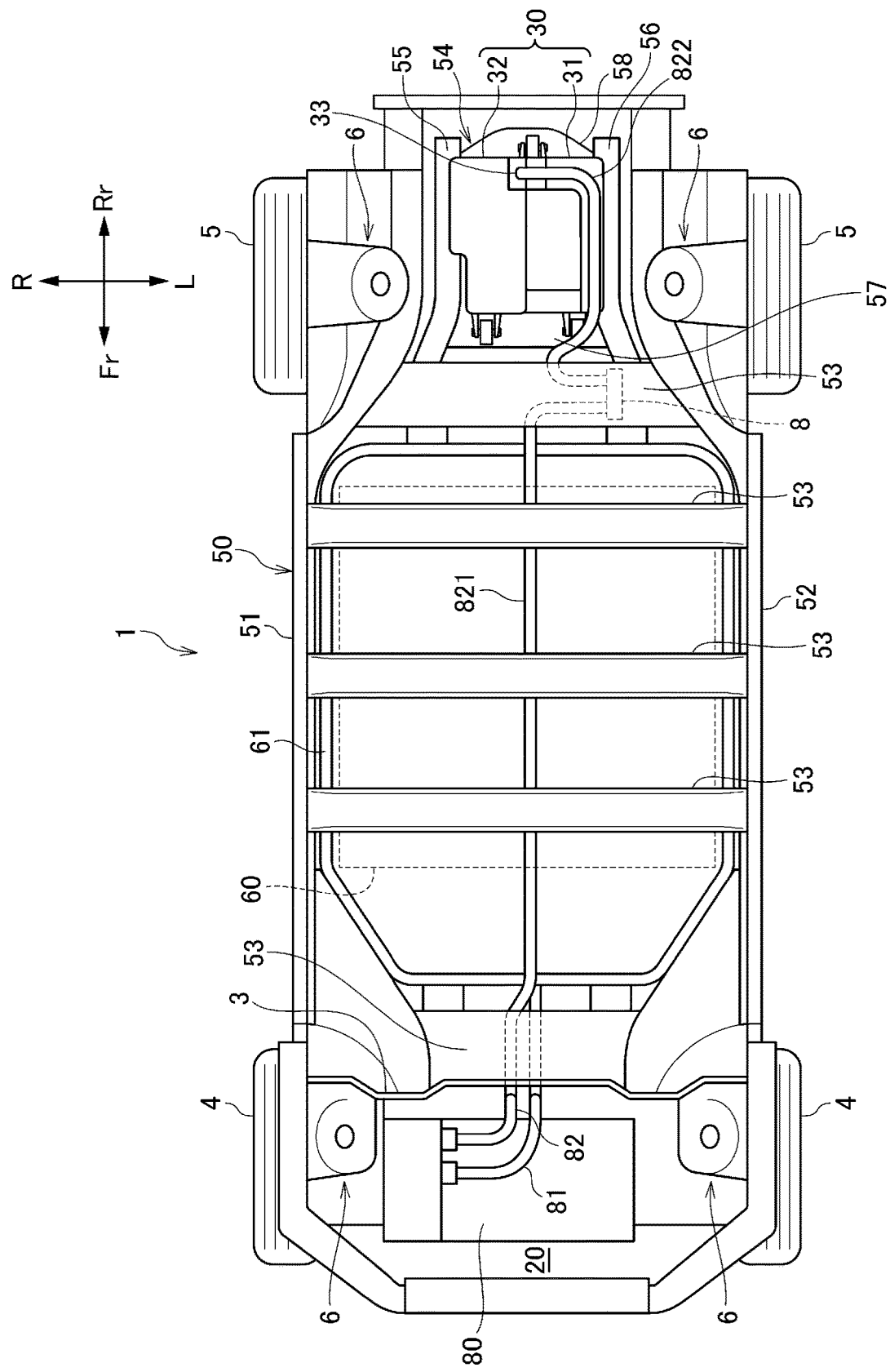
FIG. 2 is a plan view showing an underfloor structure of the vehicle of FIG. 1.

As shown in FIGS. 1 and 2, a vehicle 1 according to an embodiment of the present invention is formed by a vehicle interior 10 and a front room 20 in front of the vehicle interior 10, which are defined by a floor panel 2 and a dash panel 3. Front seats 11 and rear seats 12 are provided in the vehicle interior 10. A driving device unit 30 as an electric equipment is provided below the floor panel 2 behind the rear seats 12. The drive device unit 30 drives left and right rear wheels 5. That is, in the vehicle 1, the left and right rear wheels 5 are driving wheels, and left and right front wheels 4 are driven wheels. The front wheels 4 and the rear wheels 5 are supported by a vehicle body frame 50 via suspensions (not shown) supported by respective suspension support portions 6.

A battery 60 including a plurality of battery modules 60a is disposed below the vehicle interior 10. The battery 60 is accommodated in a battery case 61 and disposed below the floor panel 2.

The vehicle body frame 50 includes a pair of left and right side members 51, 52 extending in a front-rear direction, a plurality of cross members 53 extending in a left-right direction and connecting the side members 51, 52, and a sub-frame 54 having a rectangular shape so as to surround the driving device unit 30. The sub-frame 54 includes a pair of sub-side members 55, 56 supported by the pair of side members 51, 52, and a front frame member 57 and a rear frame member 58 that connect the pair of sub-side members 55, 56.

[Driving Device Unit]

Figure 4:
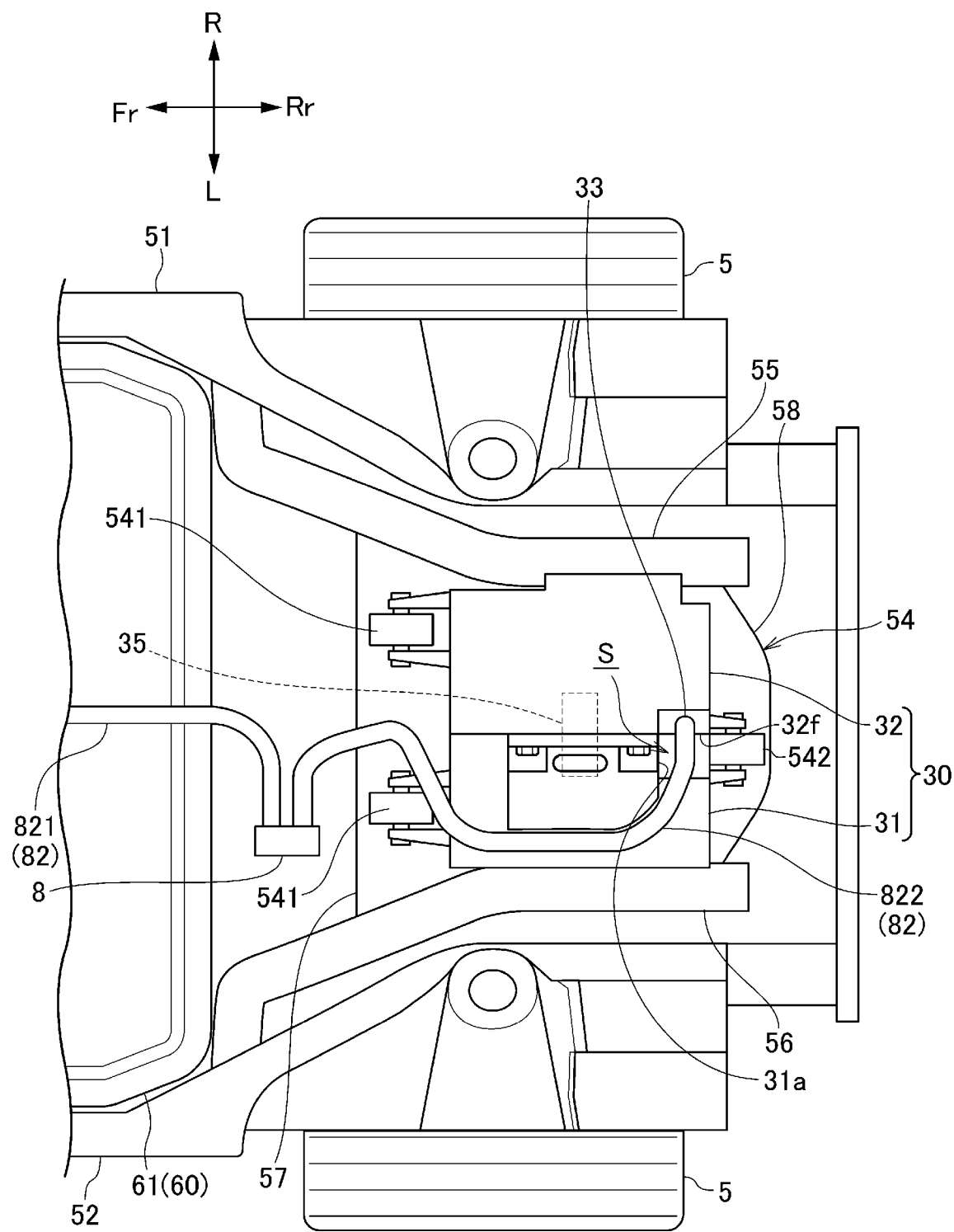
FIG. 4 is a plan view of a driving device unit including an electrical apparatus and the periphery thereof in the vehicle of FIG. 1.
Figure 5:
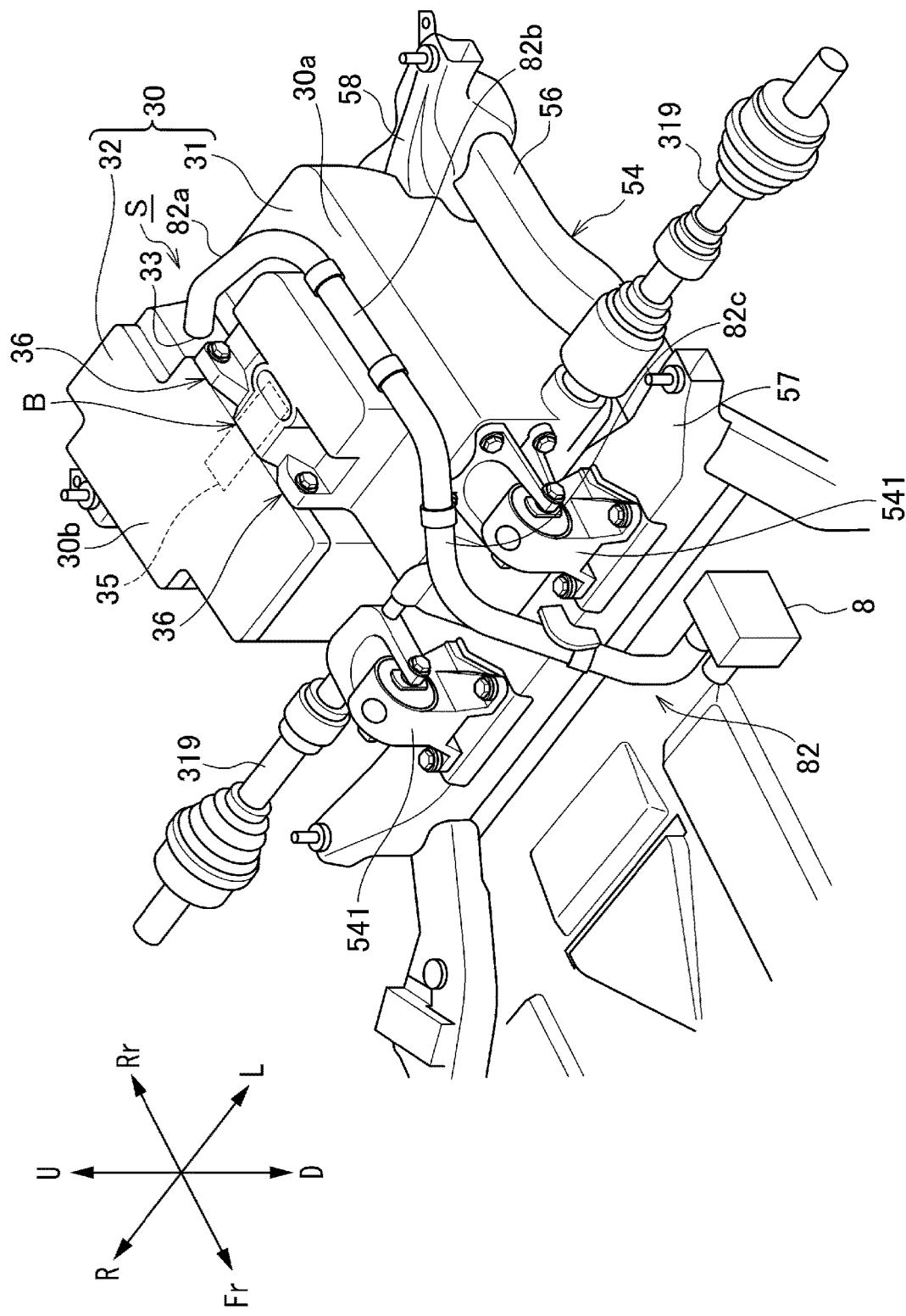
FIG. 5 is a perspective view of the driving device unit and the periphery thereof in the vehicle of FIG. 1.

As shown in FIGS. 4 and 5, the driving device unit 30 is fixed to the rear frame member 58 via a rear mounting portion 542, and is fixed to the front frame member 57 via a pair of front mounting portions 541. The driving device unit 30 includes a drive device 31 which accommodates a motor MOT as an electric motor, and a power control unit (PCU) 32 as an electric motor control unit configured to control the motor MOT. The drive device 31 is provided with a transmission (not shown), and torque of the motor MOT is transmitted to an output shaft 319 via the transmission, and is transmitted from the output shaft 319 to the rear wheels 5. The driving device 31 and the PCU 32 are arranged side by side in a width direction of the vehicle 1 in a top view.

Figure 6:
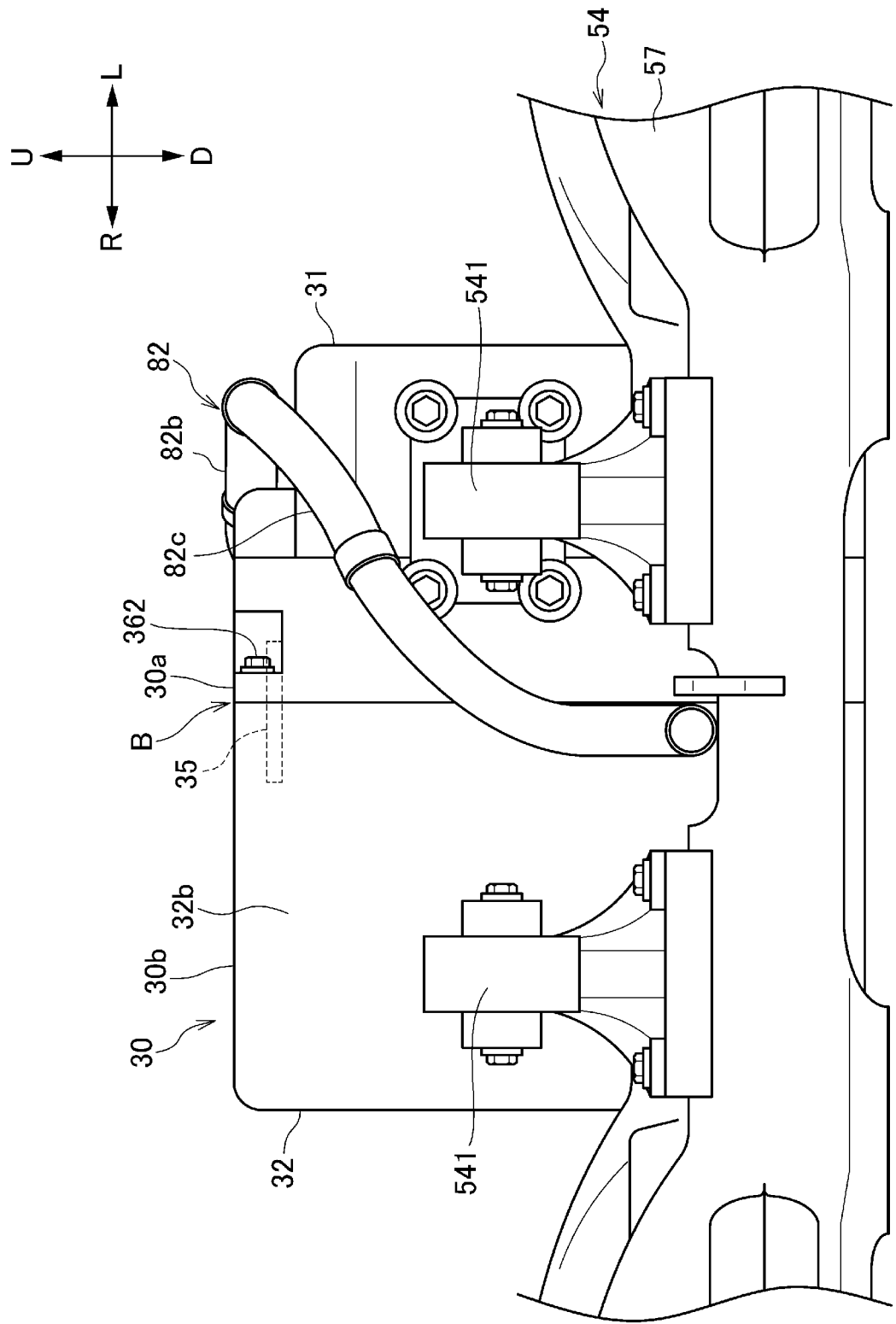
FIG. 6 is a front view of the driving device unit and the periphery thereof in the vehicle of FIG. 1.
Figure 7:
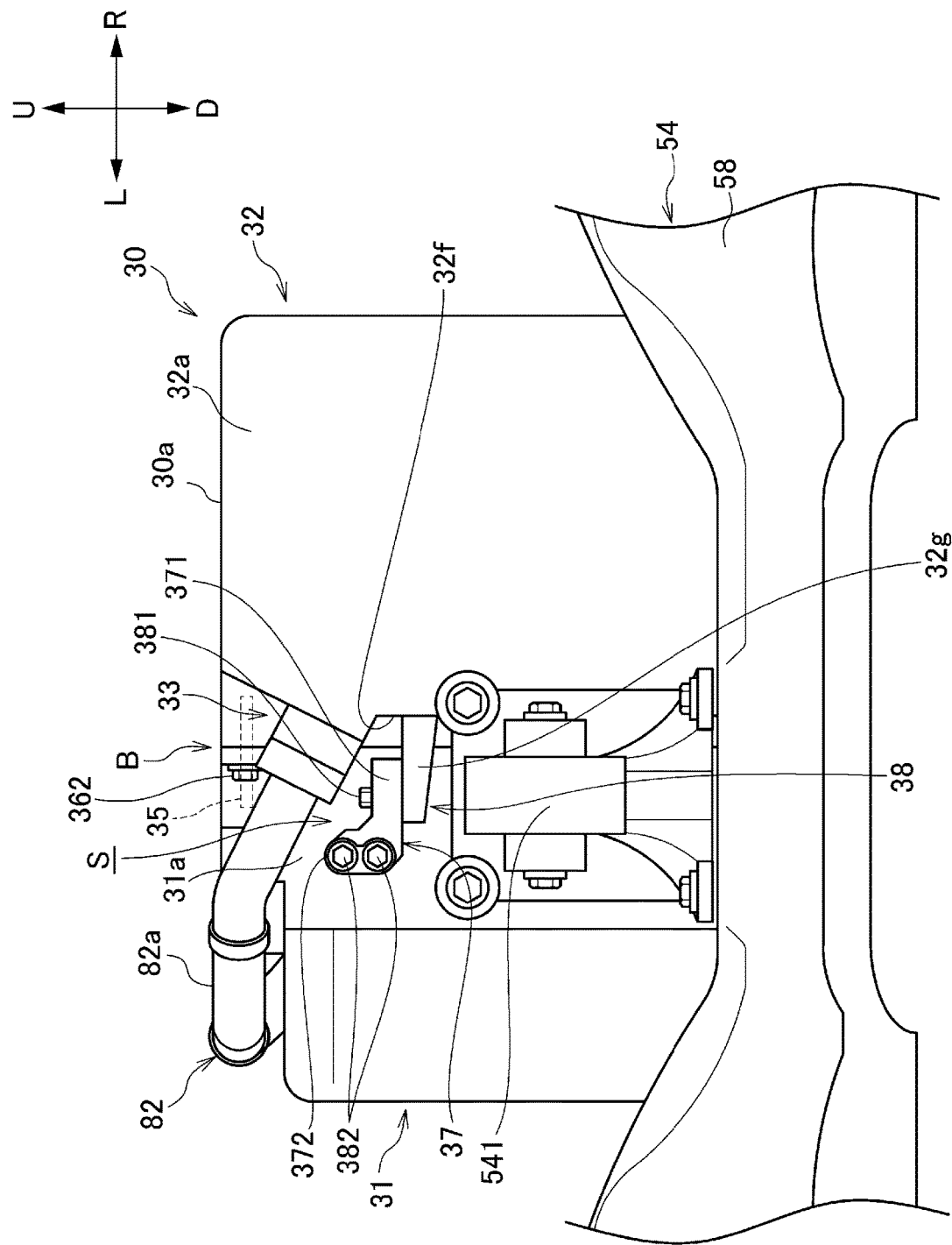
FIG. 7 is a back view of the driving device unit and the periphery thereof in the vehicle of FIG. 1.

Referring to FIGS. 6 and 7, electric circuits inside the drive device 31 and the PCU 32 are electrically connected by an electrical connection portion 35. The electrical connecting portion 35 is disposed at a joining portion B between the drive device 31 and the PCU 32 in a top view. The drive device 31 and the PCU 32 has a spatial portion S positioned away from the electrical connection portion 35 in the front-rear direction of the vehicle 1, and the spatial portion S is formed by a rear surface 31a of the drive device 31 facing in the front-rear direction (along the left-right direction) and a side surface 32f of the PCU 32 that is substantially orthogonal to the rear surface 31a of the drive device 31 and faces in the left-right direction (along the front-rear direction).

[Cable Arrangement]

Figure 3:
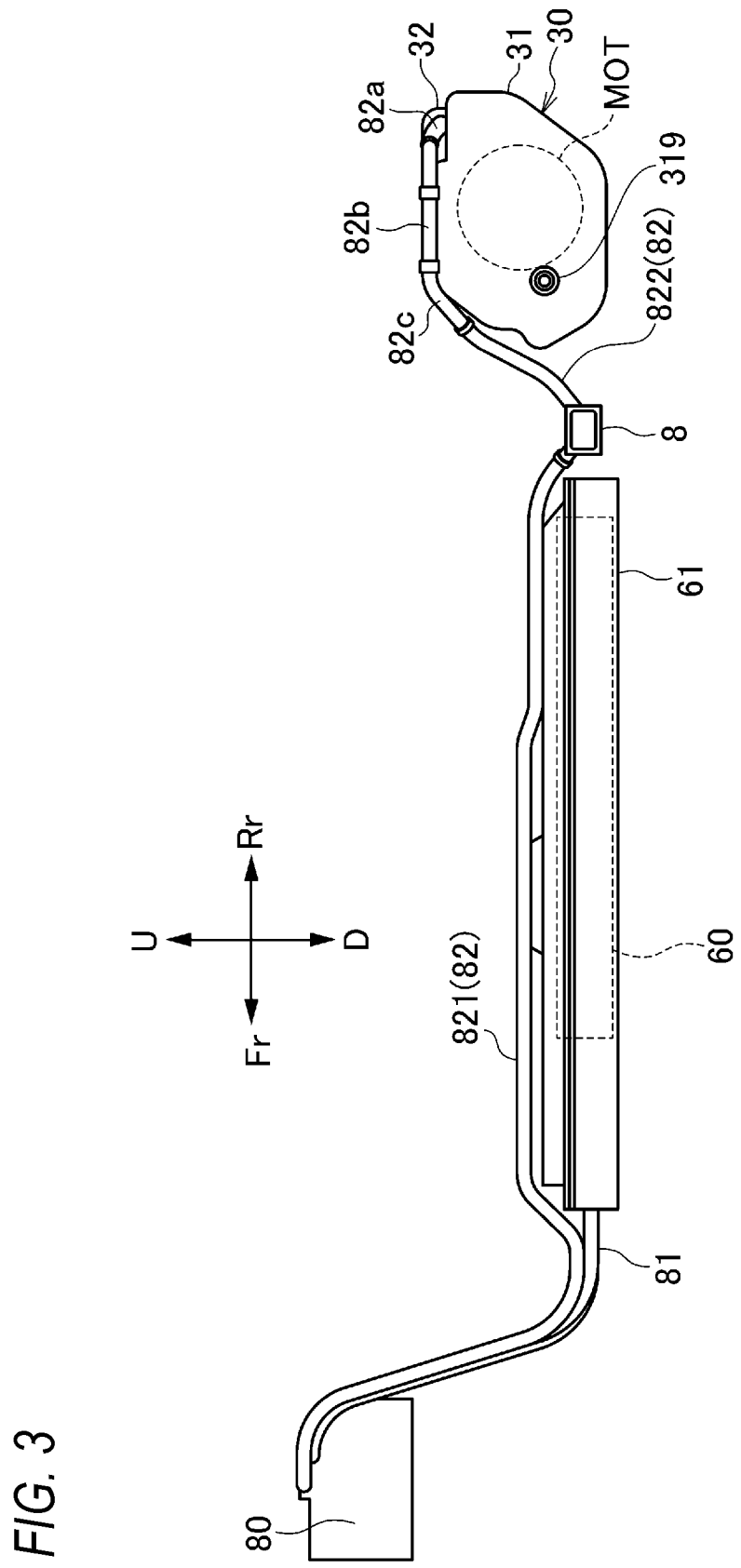
FIG. 3 is a side view showing the arrangement of a cable in the vehicle of FIG. 1.

As shown in FIGS. 2 and 3, the front room 20 is provided with a junction box 80 connected to a charging port (not shown) that is provided at an upper portion of a front end of the vehicle 1. The junction box 80 is connected to the battery 60 via a battery cable 81, and connected to the PCU 32 via a PCU cable 82. The PCU cable 82 includes a first cable 821 extending from the junction box 80 and a second cable 822 extending from the PCU 32. The first cable 821 and the second cable 822 are connected to each other via a joint box 8 fixed to a lower surface of the cross member 53 located between the battery 60 and the driving device unit 30.

[Cable Connection Portion]

As shown in FIGS. 5 to 7, on a rear side of the vehicle 1, a cable connection portion 33 of the PCU 32 is disposed at a position which is on a front side (inner side) of a rearmost surface 32a on a rear side of the PCU 32, and lower than an uppermost surface 30b of the PCU 32 positioned at the highest position of an upper surface 30a of the driving device unit 30. In a top view, the PCU cable 82 is disposed along the upper surface 30a of the drive device 31, and includes a first wire portion 82a extending leftward from the cable connection portion 33 in the width direction of the vehicle 1, a second wire portion 82b continuously extending forward from the first wire portion 82a in the front-rear direction, and a third wire portion 82c continuously extending rightward from the second wire portion 82b in the width direction.

As shown in FIGS. 5 and 7, the cable connection portion 33 is disposed on the side surface 32f of the PCU 32 in the spatial portion S which is on the rear side of the electrical connection portion 35 and formed by the rear surface 31a of the drive device 31 and the side surface 32f of the PCU 32. According to such a configuration, the cable connection portion 33 is surrounded by a rigid body in at least two directions, damage during the collision of the vehicle 1 or the like can be avoided. Further, since the cable connection portion 33 is positioned at a distal side farther away from the vehicle interior 10 than the electrical connection portion 35, even if the PCU cable 82 is detached from the cable connection portion 33 during the collision of the vehicle 1 or the like, an influence on the vehicle interior 10 can be reduced.

As shown in FIG. 4, the cable connection portion 33 is disposed on a front side of the rear mounting portion 542. Since the cable connection portion 33 of the driving device unit 30 disposed on the rear side of the vehicle 1 is disposed on the front side of the rear mounting portion 542, the cable connection portion 33 is protected by the rear mounting portion 542 when a load is input from the rear side where an influence on the driving device unit 30 is relatively large.

The cable connection portion 33 is disposed in a vicinity of the rear mounting portion 542 in the width direction of the vehicle 1. Accordingly, the cable connection portion 33 is provided at a position close to the rear mounting portion 542, so that a displacement of the cable connection portion 33 at the time of turning of the vehicle is reduced, and the stress acting on the cable connection portion 33 is reduced.

[Electrical Connection Portion]

Figure 8:
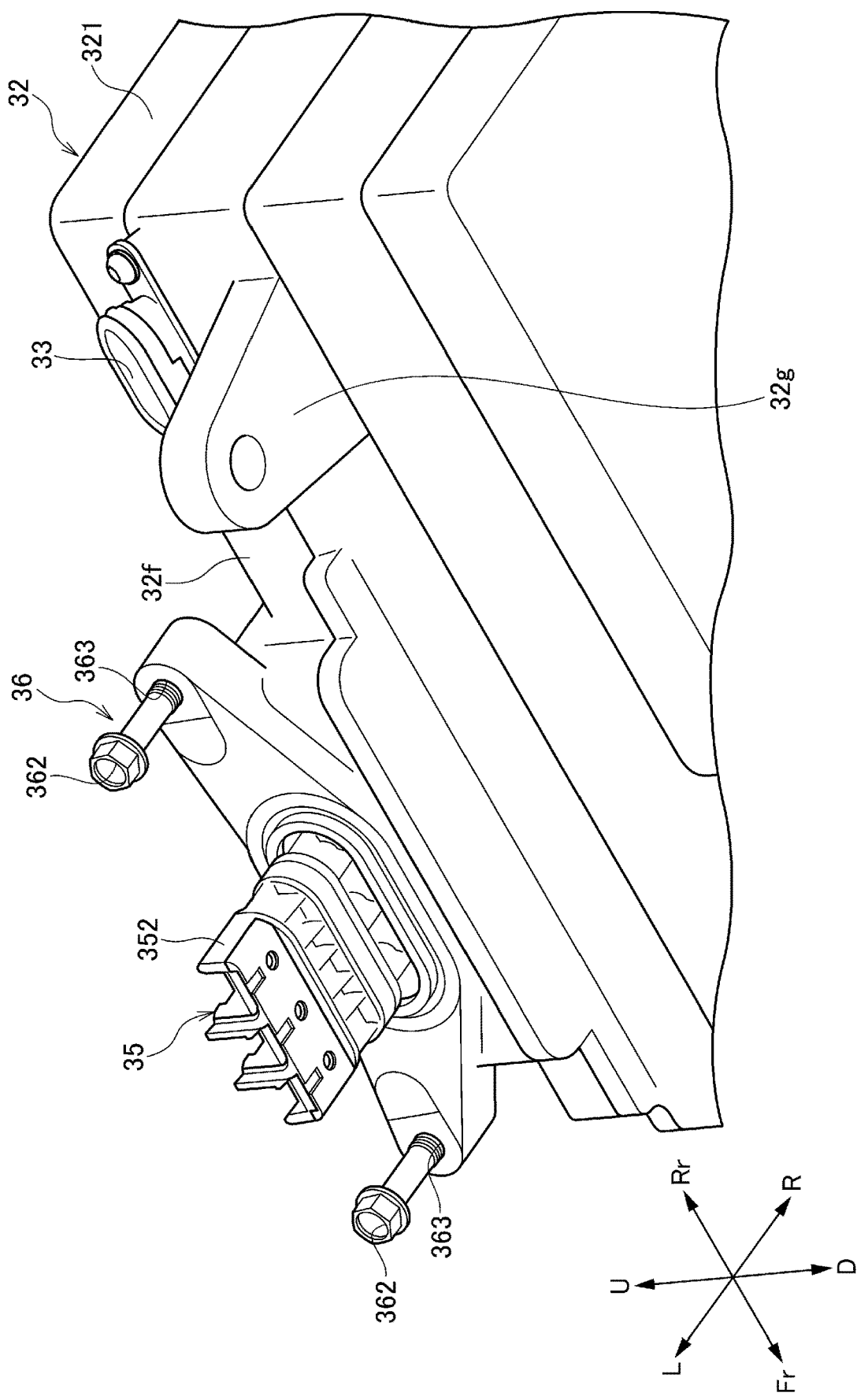
FIG. 8 is a perspective view of main parts of an electrical connection portion of the driving device unit in the vehicle of FIG. 1.
Figure 9:
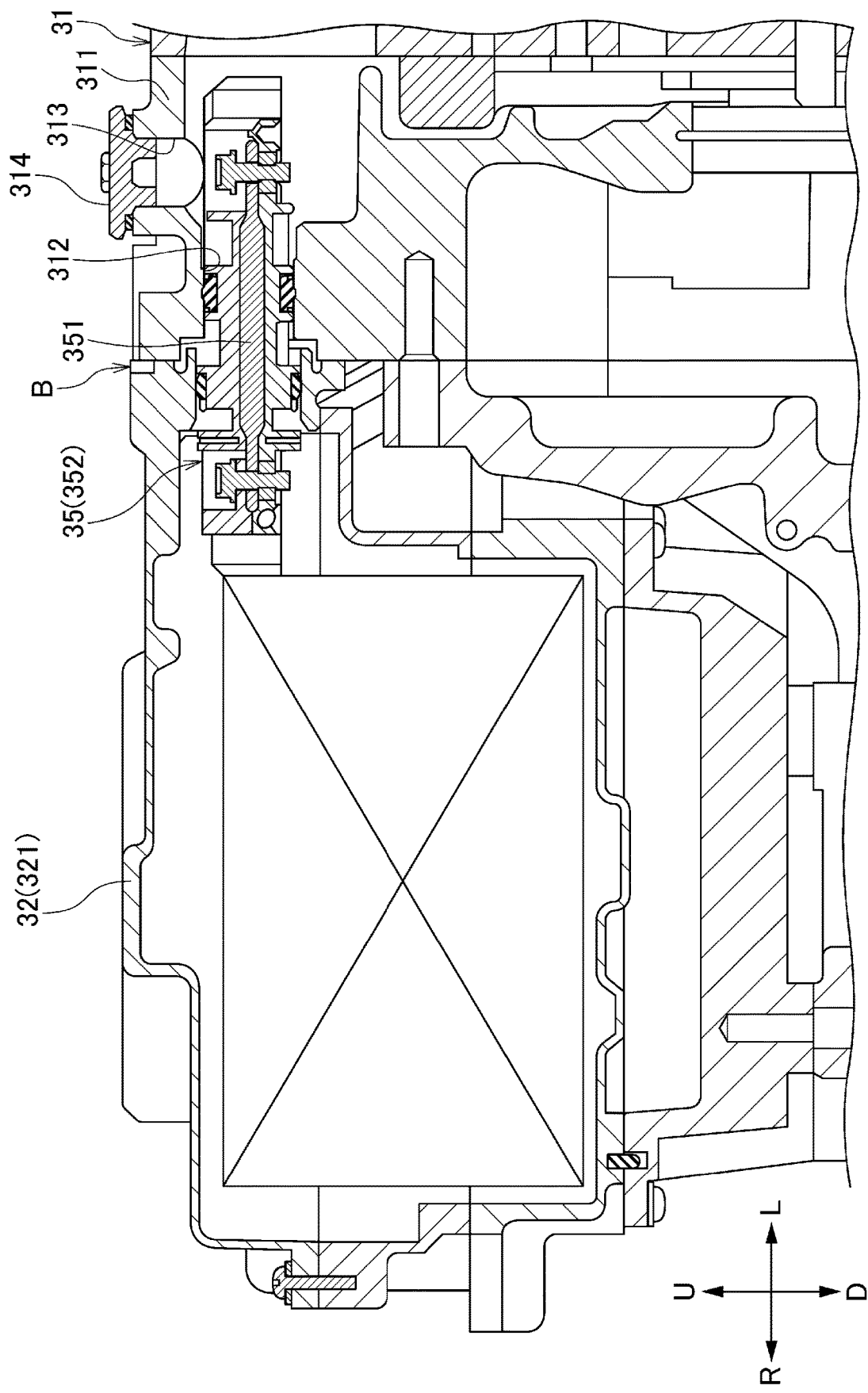
FIG. 9 is a sectional view of main parts of the electrical connection portion of the driving device unit in the vehicle of FIG. 1.

As shown in FIGS. 8 and 9, the electrical connection portion 35 according to the present embodiment includes three bus bars 351 and a holding member 352 which holds the bus bars 351 in an insulation state. The electrical connection portion 35 is attached to a case 321 of the PCU 32 in a state where the bus bars 351 are electrically connected to the inverter of the PCU 32. As shown in FIG. 8, one end side of the electrical connection portion 35 attached to the case 321 of the PCU 32 is disposed inside the case 321 of the PCU 32, and the other end side thereof protrudes from the case 321 (the joining portion 33) of the PCU 32 in the vehicle width direction.

When the PCU 32 is attached to the drive device 31, the other end side of the electrical connection portion 35 is inserted into a recess 312 formed in a case 311 (the joining portion 33) of the drive device 31. The case 311 of the drive device 31 includes a work window 313 through which the bus bars 351 of the electrical connection portion 35 inserted into the recess 312 can be visibly observed, and a cover 314 which covers the work window 313 in a manner that the window 313 is able to be opened or closed, and an electrical connection work between the bus bars 351 and the motor MOT is performed from the outside of the case 311 via the work window 313.

[First Fixing Portion]

As shown in FIG. 8, the driving device unit 30 includes a first fixing portion 36 that directly fixes the drive device 31 and the PCU 32 in the vicinity of the electrical connection portion 35. More specifically, the first fixing portion 36 of the present embodiment is part of the case 311 (joining portion B) of the drive device 31, and is provided in a pair with the electrical connection portion 35 sandwiched in the front-rear direction. Each first fixing portion 36 includes a bolt fastening hole 363 to which a bolt 362 is fastened.

[Second Fixing Portion]

Figure 10:
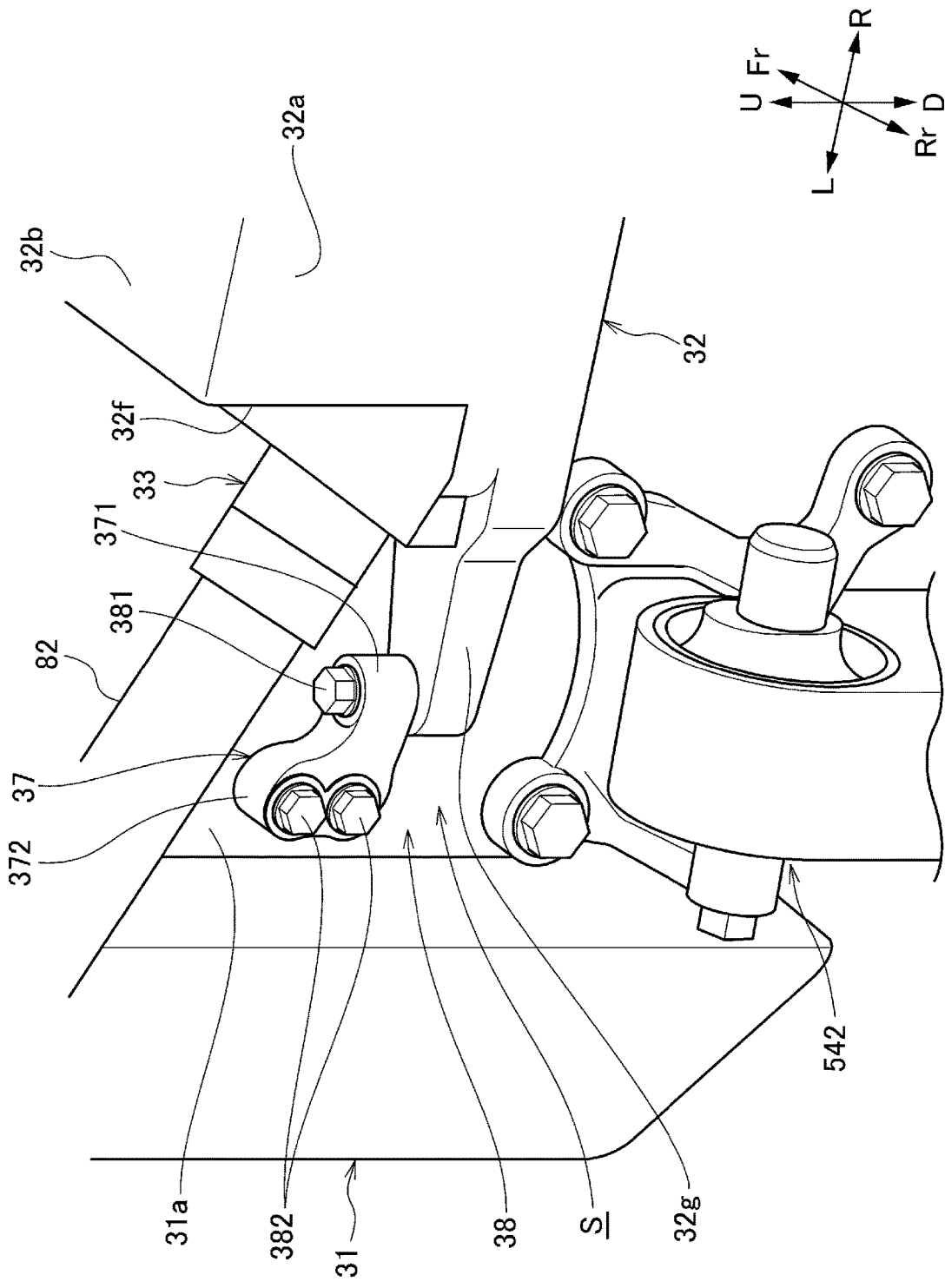
FIG. 10 is a perspective view of a second fixing portion of the driving device unit and the periphery thereof in the vehicle of FIG. 1.

As shown in FIGS. 7 and 10, the driving device unit 30 includes a second fixing portion 38 that fixes the drive device 31 and the PCU 32 via the stiffener 37 at a position away from the electrical connection portion 35. According to such a driving device unit 30, vibrations can be suppressed and stress acting on the electrical connection portion 35 can be reduced by the first fixing portions 36 that are positioned in the vicinity of the electrical connection portion 35 and fix the drive device 31 and the PCU 32, and the second fixing portion 38 that is positioned away from the electrical connection portion 35 and fixes the drive device 31 and the PCU 32.

If the drive device 31 and the PCU 32 are directly fixed by the first fixing portions 36 in the vicinity of the electrical connection portion 35, and the drive device 31 and the PCU 32 are directly fixed also by the second fixing portion 38 away from the electrical connection portion 35, a step is generated due to tolerance, and seal leakage may occur due to the step. However, the drive device 31 and the PCU 32 are mechanically connected via the stiffener 37 in the second fixing portion 38, so that the tolerance between the drive device 31 and the PCU 32 can be absorbed.

As shown in FIG. 4, the stiffener 37 is disposed in the spatial portion S described above in a top view. Specifically, a stiffener 37 is disposed in the spatial portion S which is positioned away from the electrical connection portion 35 in the front-rear direction of the vehicle 1, and is formed by the rear surface 31a of the drive device 31 facing in the front-rear direction, and the side surface 32f of the PCU 32 that is substantially orthogonal to the rear surface 31a of the drive device 31 and faces in the left-right direction. According to such a configuration, not only the dead space can be effectively used, but also the stiffener 37 can be prevented from protruding.

Returning to FIG. 7 and FIG. 10, the side surface 32f of the PCU 32 is provided with an extension portion 32g extending in the left-right direction through the spatial portion S. The stiffener 37 includes a first fastening portion 371 bolt-fastened to the extension portion 32g of the PCU 32 along the upper-lower direction via a bolt 381, and a second fastening portion 372 bolt-fastened to the rear surface 31a of the drive device 31 along the front-rear direction via a pair of bolts 382. According to such second fixing portion 38, it is possible to reduce the damage of the PCU 32 body due to the breaking of the extension portion 32g at the time of a vehicle collision. Further, the bolt 381 remaining in the broken extension portion 32g extends in the upper-lower direction, so as to be prevented from sticking into the drive device 31 and the PCU 32.

The cable connection portion 33 provided in the PCU 32 is disposed in the vicinity of the stiffener 37. Specifically, the extension portion 32g of the PCU 32 fixed to the stiffener 37 is located below the cable connection portion 33. According to such a configuration, the vibration of the cable connection portion 33 is suppressed, so that the stress applied to the PCU cable 82 can be reduced by the acceleration force applied when the vehicle travels or turns.

As shown in FIG. 7, the stiffener 37 and the cable connection portion 33 are arranged so as to overlap in the upper-lower direction. According to such a configuration, the periphery of the cable connection portion 33 can be configured in a compact manner even if the stiffener 37 is provided. The PCU cable 82 is flexible, so that it can be arranged while avoiding interference with the stiffener 37.

The stiffener 37 and the cable connection portion 33 are arranged so as to overlap the rear mounting portion 542 in the left-right direction. According to such a configuration, the stress applied to the PCU cable 82 can be reduced by the acceleration force applied when the vehicle travels or turns. Further, the stiffener 37 and the cable connection portion 33 can be protected since an impact at the time of a vehicle collision is received by the rear mounting portion.

The above embodiment may be appropriately modified, improved, or the like. For example, two first fixing portions 36 and one second fixing portion 38 are shown in the above embodiment, but the number of the first fixing portion 36 and the second fixing portion 38 may be one or plural.

At least the following matters are described in the present specification. Corresponding components in the above-described embodiments are shown in parentheses, without being limited thereto.

(1) A driving device unit (driving device unit 30) including:
an electric motor (motor MOT) configured to drive a vehicle (vehicle 1);
a drive device (drive device 31) accommodating the electric motor; and
an electric motor control device (PCU 32) configured to control the electric motor,
wherein the drive device and the electric motor control device are arranged side by side in a horizontal direction (left-right direction),
wherein an electrical connection portion (electrical connection portion 35) electrically connecting the drive device and the electric motor control device is disposed at a joining portion (joining portion B) between the drive device and the electric motor control device, and
wherein the drive device and the electric motor control device include:
a first fixing portion (first fixing portion 36) that directly fixes the drive device and the electric motor control device in the vicinity of the electrical connection portion; and
a second fixing portion (second fixing portion 38) that fixes the drive device and the electric motor control device via a stiffener (stiffener 37) at a position away from the electrical connection portion.

According to (1), vibrations can be suppressed and stress acting on the electrical connection portion can be reduced by the first fixing portion that is positioned in the vicinity of the electrical connection portion and fixes the drive device and the electric motor control device, and the second fixing portion that is positioned away from the electrical connection portion and fixes the drive device and the electric motor control device. If the drive device and the electric motor control device are directly fixed by the first fixing portion in the vicinity of the electrical connection portion, and the drive device and the electric motor control device are directly fixed also by the second fixing portion away from the electrical connection portion, a step is generated due to tolerance, and seal leakage may occur due to the step. However, the drive device and the electric motor control device are mechanically connected via the stiffener in the second fixing portion, so that the tolerance between the drive device and the electric motor control device can be absorbed. The "horizontal direction" may be a direction orthogonal to the upper-lower direction, and includes a front-rear direction, a left-right direction, or a direction inclined from these directions.

(2) In the driving device unit according to (1),
the drive device and the electric motor control device are arranged side by side in a first direction (left-right direction), and
the stiffener is disposed in a spatial portion (spatial portion S) which is positioned away from the electrical connection portion in a second direction (front-rear direction) orthogonal to the first direction in a top view, and is formed by an end surface (rear surface 31a) of the drive device facing the second direction, and an end surface (side surface 32f) of the electric motor control device that is substantially orthogonal to the end surface of the drive device and faces the first direction.

According to (2), the stiffener is disposed in the spatial portion which is positioned away from the electrical connection portion and formed by the end surface of the drive device and the end surface of the electric motor control device that are substantially orthogonal to each other, so that the dead space can be effectively used, and the stiffener can be prevented from protruding.

(3) In the driving device unit according to (2),
the end surface of the electric motor control device is provided with an extension portion (extension portion 32g) extending in the first direction through the spatial portion, and the stiffener includes:
  a first fastening portion (first fastening portion 371) bolt-fastened to the extension portion of the electric motor control device in the upper-lower direction; and
  a second fastening portion (second fastening portion 372) bolt-fastened to the end surface of the drive device in the second direction.

According to (3), even if the extension portion of the electric motor control device is broken at the time of a vehicle collision, the electric motor control device can be prevented from being damaged by a bolt remained in the extension portion.

(4) In the driving device unit according to (2) or (3),
the electric motor control device is provided with a power line connection portion (cable connection portion 33) to which a power line (PCU cable 82) is connected, and
the power line connection portion is provided in the vicinity of the stiffener.

According to (4), the stress applied to the power line can be reduced by the acceleration force applied when the vehicle travels or turns.

(5) In the driving device unit according to (4),
the stiffener and the power line connection portion overlap in the upper-lower direction.

According to (5), the stiffener and the power line connection portion of the electric motor control device overlap in the upper-lower direction, so that the structure around the power line connection portion can be reduced in size while using the flexibility of the cable.

(6) In the driving device unit according to (4) or (5),
the driving device unit is supported via a mounting portion (rear mounting portion 542) on a sub-frame (sub-frame 54) having a rectangular shape so as to surround the driving device unit, and the stiffener and the power line connection portion overlap with the mounting portion in the first direction.

According to (6), the stress applied to the power line can be reduced by the acceleration force applied when the vehicle travels or turns. Further, the stiffener and the power line connection portion can be protected since an impact at the time of a vehicle collision is received by the mounting portion.

(7) In the driving device unit according to (3),
the electric motor control device is provided with a power line connection portion (cable connection portion 33) to which a power line (PCU cable 82) is connected, and the extension portion is positioned below the power line connection portion.

According to (7), the power line connection portion is disposed above the extension portion to which the stiffener is fixed, so that the stress applied to the power line can be reduced by the acceleration force applied when the vehicle travels or turns.

The invention claimed is:

1. A driving device unit comprising:
an electric motor configured to drive a vehicle;
a drive device accommodating the electric motor; and
an electric motor control device configured to control the electric motor,
wherein the drive device and the electric motor control device are arranged side by side in a horizontal direction, and
wherein an electrical connection portion electrically connecting the drive device and the electric motor control device is disposed at a joining portion between the drive device and the electric motor control device, and
wherein the drive device and the electric motor control device include:
  a first fixing portion that directly fixes the drive device and the electric motor control device in the vicinity of the electrical connection portion; and
  a second fixing portion that fixes the drive device and the electric motor control device via a stiffener at a position away from the electrical connection portion.

2. The driving device unit according to claim 1,
wherein the drive device and the electric motor control device are arranged side by side in a first direction, and
wherein the stiffener is disposed in a spatial portion which is positioned away from the electrical connection portion in a second direction orthogonal to the first direction in a top view, and is formed by an end surface of the drive device facing the second direction, and an end surface of the electric motor control device that is substantially orthogonal to the end surface of the drive device and faces the first direction.

3. The driving device unit according to claim 2,
wherein the end surface of the electric motor control device is provided with an extension portion extending in the first direction through the spatial portion, and
wherein the stiffener includes:
  a first fastening portion bolt-fastened to the extension portion of the electric motor control device in the upper-lower direction; and
  a second fastening portion bolt-fastened to the end surface of the drive device in the second direction.

4. The driving device unit according to claim 2,
wherein the electric motor control device is provided with a power line connection portion to which a power line is connected, and
wherein the power line connection portion is provided in the vicinity of the stiffener.

5. The driving device unit according to claim 4,
wherein the stiffener and the power line connection portion overlap in the upper-lower direction.

6. The driving device unit according to claim 4,
wherein the driving device unit is supported via a mounting portion on a sub-frame having a rectangular shape so as to surround the driving device unit, and
wherein the stiffener and the power line connection portion overlap with the mounting portion in the first direction.

7. The driving device unit according to claim 3,
wherein the electric motor control device is provided with a power line connection portion to which a power line is connected, and
wherein the extension portion is positioned below the power line connection portion.

* * * * *